United States Patent [19]

Onda et al.

[11] Patent Number: 5,623,712
[45] Date of Patent: Apr. 22, 1997

[54] CAMERA HAVING A GRIP RECESS AND A LENS BARREL RECESS WHICH COOPERATE TO PROVIDE A FINGER RECEIVING RECESS

[75] Inventors: Hiroki Onda, Nagano-ken; Kazuhiko Watarai, Tama; Mutsumi Naruse, Hachioji, all of Japan

[73] Assignee: Olympus Optical Co. Ltd., Tokyo, Japan

[21] Appl. No.: 411,401

[22] Filed: Mar. 28, 1995

Related U.S. Application Data

[63] Continuation of Ser. No. 113,599, Aug. 27, 1993, abandoned.

[30] Foreign Application Priority Data

Aug. 31, 1992 [JP] Japan ..................................... 4-232101

[51] Int. Cl.⁶ .................................................. G03B 17/02
[52] U.S. Cl. .................................. 396/424; 396/540
[58] Field of Search ..................... 354/82, 288; 396/424, 396/540

[56] References Cited

U.S. PATENT DOCUMENTS

4,736,219  4/1988  Yamanaka et al. ...................... 354/288
4,772,902  9/1988  Inoue et al. ................................ 354/82
4,801,960  1/1989  Hansen ...................................... 354/288
4,875,065  10/1989  Kubodera et al. ......................... 354/82
4,918,477  4/1990  Matsuda et al. ......................... 354/288
5,177,517  1/1993  Schappler et al. ........................ 354/82
5,218,390  6/1993  Swayze ..................................... 354/82
5,227,822  7/1993  Takahashi et al. ........................ 354/82

Primary Examiner—Safet Metjahic
Assistant Examiner—J. K. Han
Attorney, Agent, or Firm—Louis Weinstein

[57] ABSTRACT

The present invention provides a camera comprising an opening that is located in a camera body and defines a film screen, a lens barrel located in front of the opening and extended forward of the camera body, a projection located behind the opening, a grip that ls formed on one side surface of the projection, whose back end lies ahead of the back end of the projection, and that is held with the fingers of a photographer's hand during photography, and a recess that is formed on the outer circumference of the outer wall of the lens barrel, located in an area substantially opposed to the grip, and dented toward the inner circumference of the lens barrel.

2 Claims, 6 Drawing Sheets

CAMERA HAVING A GRIP RECESS AND A LENS BARREL RECESS WHICH COOPERATE TO PROVIDE A FINGER RECEIVING RECESS

This is a continutation of application Ser. No. 08/113,599, filed Aug. 27, 1993, now abandoned.

BACKGROUND OF THE INVENTION

1. Field of the Invention

The present invention relates to the outline of a camera and more particularly to a camera outline which facilitates handling and use thereof.

2. Descrpiton of the Related Art

In the past, a drawback has become apparent when a photographer holds a camera with the fingers and carries out photography: a hand tremor occurs readily, or a photographer soon gets fatigued because of the shape of the camera that is hard to hold. When a zoom optical system is used as a lens array, a lens barrel itself gets heavier to make the drawback more critical.

As a technological means for resolving the foregoing drawback, U.S. Pat. No. 5,227,822 has proposed a camera offering an improved holding characteristic. This camera includes an opening that is located in a camera body and defines a film screen, and a lens barrel located in front of the opening and extended forward of the camera body. The camera further includes a projection located behind the opening, a grip that is located on one side surface of the projection, whose back end is located foward of the back end of the projection, and that is gripped with the fingers of a photographer's hand during photography. The other side surface of the projection has a flat portion that is substantially even with the side surface of the lens barrel. Owing to this outline, when the camera is held with the fingers of one hand, the arm will not part from the body. Moreover, when a viewfinder optical system is looked into, the fingers will not interfere with the face. The camera permits an excellent holding characteristic even when it is held with the fingers of one hand accompanied with those of the other hand.

However, in the foregoing conventional camera, when the camera is held, the tlps of the fingers holding the grip stay in a space formed between the grip and the lens barrel. When a lens permitting a high zooming ratio or low f-numbers is to be installed in a camera, the diameter of a lens barrel cannot help being large. The above space therefore gets narrower. When the grip of the camera is held, the finger tips can hardly enter the space.

In a camera for which a small-diameter Parrone can be employed, the Parrone chamber has a small diameter and the grip lies closer to the lens barrel. Even in this camera, the foregoing space Is narrow. When the grip ls held, the finger tips can hardly enter the space.

On the other hand, when a grip is located closer to a camera body in order to realize a compact camera, the aforesaid space is narrow. The aforesaid problem occurs.

As mentioned above, the holding characteristic of a camera has not been very good. The advantages provided by upgrading the stability in holding a camera; such as, decreased occurrence of a hand tremor and other photographic errors, ease of holding, and fatigue-free photography have not been available.

OBJECTS AND SUMMARY OF THE INVENTION

A first object of the present invention is to provide a camera in which a hand tremor can be avoided to the greatest extent because the hold of a grip is made more reliable and the stability in holding the camera is upgraded.

A second object of the present invention is to provide a camera in which a hand tremor can be avoided to the greatest extent, and photography can be carried out with comfort because the thumb and other fingers holding a grip will not interfere with the face.

A third object of the present invention is to provide a camera in which a hand tremor can be avoided to the greatest extent, and an action of looking into a viewfinder optical system can be done more smoothly.

A particular aspect of the present invention, therefore, is directed to a camera having:

an opening located in a camera body and defining a film screen;

a lens barrel located in front of the opening and extending in a direction forward of the camera body;

a project ion located behind the opening and extending rearwardly from the camera body; and a grip formed on one side surface of the projection and laterally spaced to the side of the projection.

The grip has a rear end which lies forward of the rear end of the projection, and it is held with the fingers of a photographer's hand during photography. The grip also has a forward recess in a forward end thereof for accommodating the hand holding the grip. A recess is formed on an outer circumference of a side portion of the outer wall of the lens barrel, and is located in an area adjacent to the grip. The recess is indented toward an inner circumference of the lens barrel and cooperates with the forward recess to accommodate at least a portion of several fingers of the hand holding the grip. The portion of the fingers is located at a back side of each of the several fingers of the hand between a tip and a knuckle which is closest to the tip.

DETAILED DESCRIPTION OF THE PREFERRED EMBODIMENTS

Embodiments of the present invention will be described with reference to the drawings.

FIGS. 1 to 10 are explanatory diagrams showing the first embodiment of the present invention.

Figure 1:
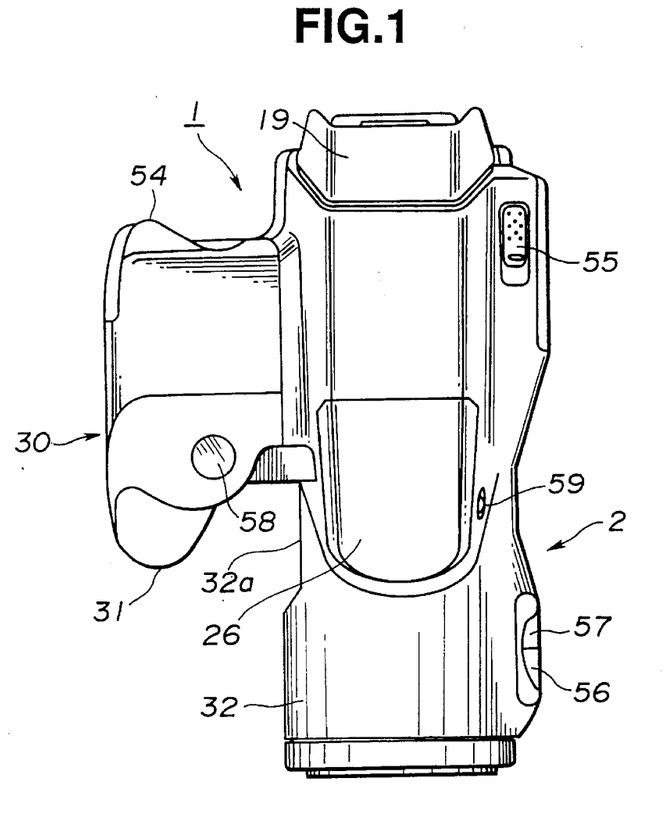
FIG. 1 is a plan view showing a camera of the first embodiment of the present invention.

FIG. 1 is a plan view showing a camera of the first embodiment.

Figure 2:
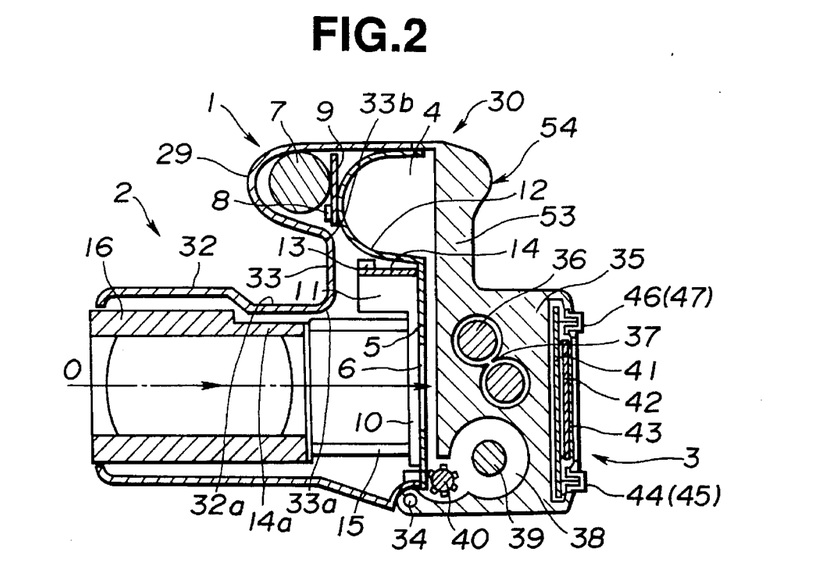
FIG. 2 shows a cross section of the camera of the first embodiment.

A camera 1 is, as shown in the cross-sectional view of FIG. 2, segmented into a camera body 2 and a back cover 3 that can be opened or closed on the camera body 2.

A back plate 5 defining a Parrone stowage 4 is located behind the camera body 2. The back plate 5 has an opening 6 that defines a film screen.

A capacitor 7 for a flashgun, which will be described later, is situated in front of the Parrone stowage 4. A printed wiring board 9, on which ICs and other electric parts 8 are mounted, is placed between the capacitor 7 and Parrone stowage 4.

A known shutter mechanism 10 is located in front of the back plate 5. A printed wiring board 14, on which ICs and other electric parts 13 are mounted, is placed between a driving mechanism 11 for the shutter mechanism 10 and a wall 12 of the Parrone stowage 4.

A mirror box 15 which will be described later is situated in front of the shutter mechanism 10. A lens barrel 16 is located in front of the mirror box 15. The optical axis O of the lens barrel 16 is aligned with the center of the opening 6.

Figure 3:
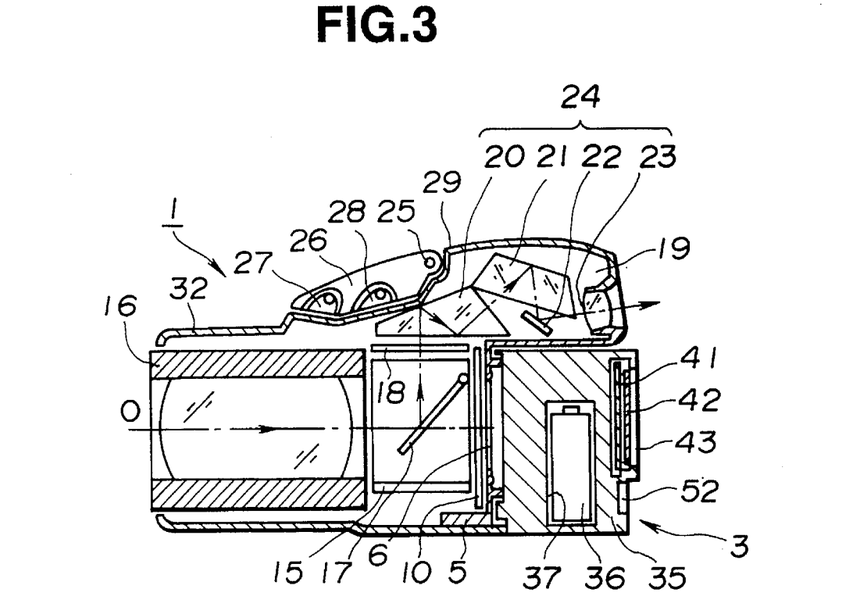
FIG. 3 shows a longitudinal section of the camera of the first embodiment with a flashgun closed.

A main mirror 17 is, as shown in the longitudinal-sectional view of FIG. 3, located in the mirror box 15. A focusing screen 18 is located above the mirror box 15 and placed substantially horizontally with the camera body 2.

The focusing screen 18 is positioned so as to be optically conjugate with a film surface.

A swelling 19 is formed above the mirror box 15 in the camera body 2 and the back cover 3.

In the swelling 19, a prism 20 is present. A roof mirror 21 is located behind the prism 20, a plane mirror 22 is situated below the back of the roof mirror 21, and an eyepiece lens 23 is located behind the plane mirror 22. These components constitute a viewfinder optical system 24.

The prism 20 has its optical incident surface oriented to the focusing screen 18 and its emission surface oriented to the roof mirror 21.

The emission surface of the roof mirror 21 is oriented to the plane mirror 22. The plane mirror 22 is oriented to the eyepiece lens 23.

A beam is transmitted by the lens barrel 16, and reflected upward by the main mirror 17. The reflected beam then forms an image on the focusing screen 18.

The image is then converted into a correct image by the prism 20, roof mirror 21, and plane mirror 22. The correct image is supplied to the rear of the camera 1 via the eyepiece lens 23, and then observed by a photographer.

When a photographer observes an image, the main mirror 17 lies at the position shown in FIG. 3 and routes a beam to the viewfinder optical system. For photography, the main mirror 17 is popped up by a driving mechanism, which is not shown, and set at a position at which the main mirror 17 substantially coincides with the focusing screen 18. The main mirror 17 then enables the beam to be routed to a film surface via the opening 6.

An axis 25 is installed on the outer wall of the camera body 2 in front of the prism 20. A flashgun 26 is pivoted by the axis 25 so that it can be closed and opened freely between a closed position at which the outline of the outer wall thereof substantially matches the outline of the outer wall of the camera body 2, and an open position at which it lies substantially upright above the camera body 2 as shown in the longitudinal-sectional view of FIG. 4.

Figure 4:
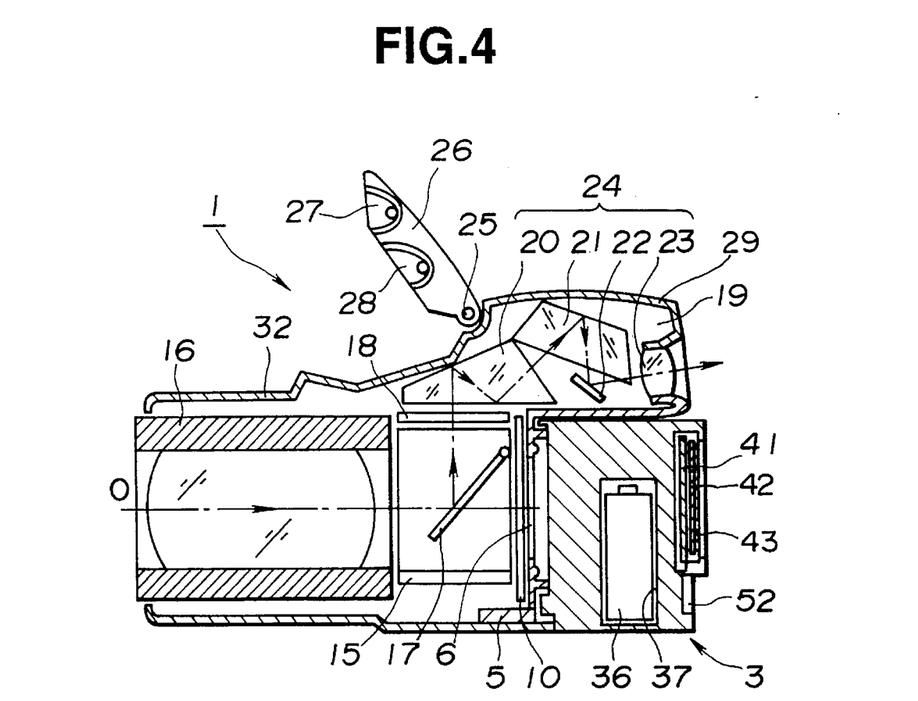
FIG. 4 shows a longitudinal section of the camera of the first embodiment wlth the flashgun opened.

When the flashgun 26 lies at the open position shown in FIG. 4, a first flashing means 27 is located in the upper part of the flashgun 26 on the surface thereof facing forward of the camera 1, and a second flashing means 28 is located below the first flashing means 27. These first flashing means 27 and second flashing means 28 are provided with power by the capacitor 7 and controlled in flashing by a control circuit which is not shown.

The outer circumferences of the front and side of the capacitor 7 are shielded with an outer wall 29 of the camera body 2, and constitute a grip front half 31 of a grip 30 to be held with a photographer's fingers.

Figure 5:
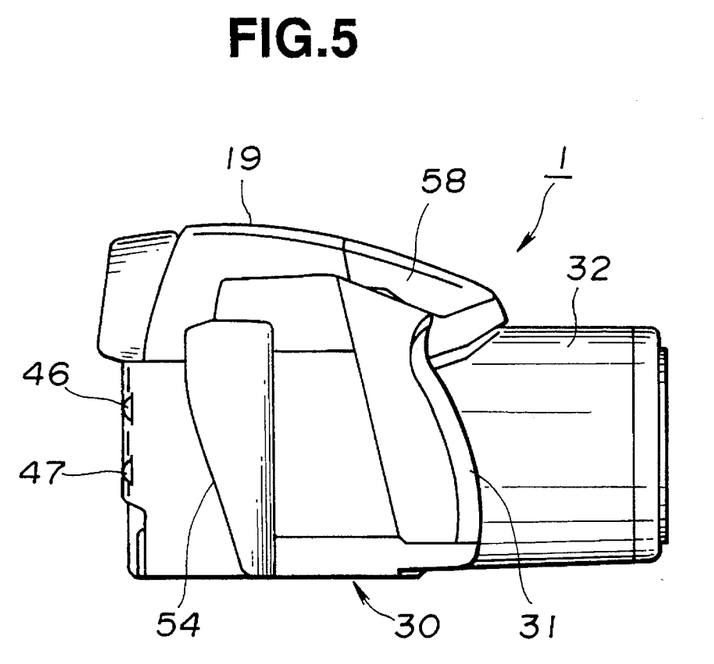
FIG. 5 is a side view viewing the camera of the first embodiment from the grip side.

The front surface of the grip front half 31 is, as shown in the side view of FIG. 5, waxing forward of the camera 1 from the upper end to the lower end thereof and thus forms a sloping surface.

The driving mechanism 11 for the shutter mechanism 10 and the printed wiring board 14 are placed in a space between the wall 12 of the Parrone stowage and the mirror box 15. The space is indispensable for ironing out curls of film carried out of a Parrone before the film reaches the opening 6.

The space in front of the driving mechanism 11 for the shutter mechanism 10 and the printed wiring board 14 is blocked with a communication wall 33 that communicates with the front half 31 of the grip 30 and the outer wall 32 of the lens barrel 16, and that trails the front half 31. The portion of the outer wall 32 opposed to the grip front half 31 is dented to form a recess 32a. When viewed from the grip 30 side, the outer wall 32 is denting toward the optical axis to form the recess 32a. Accordingly, the back half of the lens barrel 16 is smaller in diameter. The outer wall 32 is united with the communication wall 33 and an inward wall 31a of the grip via curved surfaces 33a and 33b. In an outside space entrenched with the outer wall 32 and grip inward wall 31a, the tips of the fingers holding the grip come round and stay.

The communication wall 33 is designed so that when a photographer holds the grip 30, the tips of the fingers other than the thumb will come round and stay there.

The back cover 3 is, as shown in FIG. 2, pivoted by the axis 34 on the camera body 2 so that it can freely open or close on the camera body 2.

The back cover 3 has a projection 35 that is located behind the opening 6 and projectes rearwardly from the camera 1.

A battery stowage 37 in which batteries 36 are stowed, a film wind chamber 38 for winding up exposed film, a film wind spool 39 that is driven to rotate by means of a driving source such as a motor installed in the film wind chamber 38, and a sprocket 40 are arranged in the projection 35.

A printed wlring board 41 electrically connected to the printed wiring board 9 and 14 using, for example, a flexible printed wiring board is located at the inner back end of the projection 35.

A liquid crystal display (hereinafter, LCD) 42, which displays the number of remaining film frames, the number of exposed film frames, a shutter speed, an f-number, an exposure compensation value, and other various kinds of photographic information, is electrically connected to the back of the printed wiring board 41.

The LCD 42 displays the above various photographic information in a rearward direction of the camera via a transparent protective panel 43 fixed to the back end of the projection 35.

Figure 6:
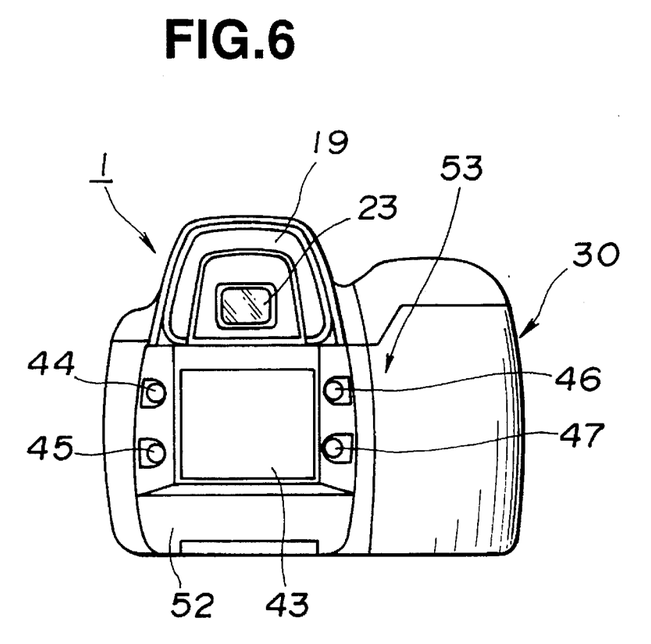
FIG. 6 is a back view viewing the camera of the first embodiment from the back side.

The printed wiring board 41 is wider than the LCD 42 and protective panel 43. Switches whose break and make are instructed with operation buttons 44 to 47 located along the margins of the LCD 42 and protective panel 43, as shown in the back view of FIG. 6, are arranged in the overflowing portion of the printed wiring board 41.

These switches are used to set or select photographic operations which are performed frequently in general; such as, exposure mode change and exposure compensation setting. A photographer can change or control various photographic operations in the camera 1 merely by pressing the operation buttons 44 to 47.

An open/close plate 52, which can freely open or close on the projection 35, is located below the LCD 42. When the open/close plate 52 is opened, switch members, which are used to set or select photographic operations that are seldom used in general; such as, film rewinding before an end of film or changing data to be superimposed on prints on film, become visible from outside the camera.

The portion of the back cover 3 behind the Parrone stowage 4 is formed as a thin section whose back end lies forward of that of the projection 35. The thin section 53 has such dimensions that even when the thumb among all the other fingers is rested thereon, it will not project backward beyond the rear end of the projection 35.

The side surface of the thin section 53 communicates with the grip 30 and forms the back half 54 of the grip 30.

The back half 54 is, as shown in the side view of FIG. 5, waxing backward of the camera from the lower end to the upper end thereof, thus forming a sloping surface.

The lower end of the back half 54 is even with the thin section 53, and the upper end thereof swells rearwardly of the thin section 53. When a photographer holds the grip 30, the thumb among all the other fingers of his/her hand stays there.

Using the plan view of FIG. 1, the sections of the appearance of the camera 1 of this embodiment will be described.

A power switch 55 is located in the left back part of the top of the camera body 2. When the power switch 55 is slided forward along the camera 1, the power supply of the camera 1 is turned on.

A pair of zoom operation buttons 56 and 57 are located on the right side surface of the outer wall 32 covering the lens barrel 16. When the operation button 56 is pressed, the lens barrel 16 zooms in to provide a large focal depth. When the operation button 57 is pressed, the lens barrel 16 zooms out to provide a small focal depth.

A release button 58 is situated on the front top of the grip 30. When the release button 58 is pressed, photographic operations are activated.

An operation knob 59 is located on the right side surface of the flashgun 26 when viewed from the front thereof. Using the operation knob 59, the flashgun 27 is opened.

Next, the operation of the camera 1 of this embodiment will be described.

To begin with, the power switch on the camera is turned on. Prior to photography, a back cover locking mechanism, which is not shown, is unlocked in order to load film in the camera 1. As shown in the cross-sectional view of FIG. 7, the back cover 3 is opened on the camera body 2.

Figure 7:
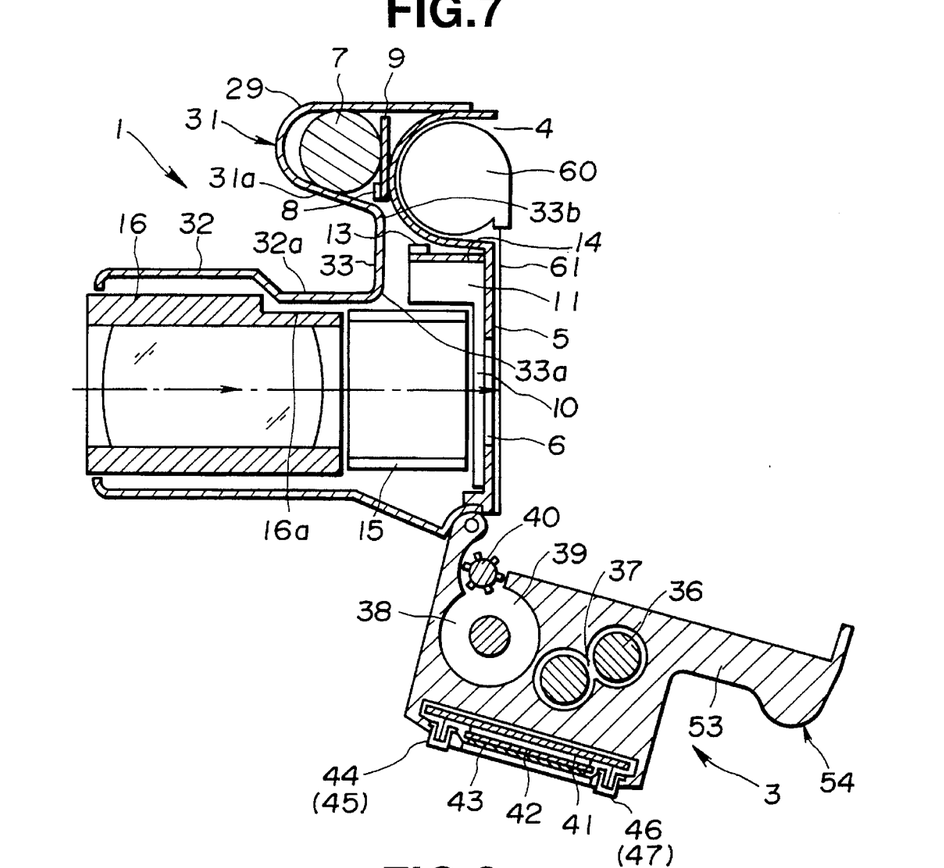
FIG. 7 shows a cross section of the camera of the first embodiment with the back cover opened.

A Parrone 60 is inserted into the Parrone stowage 4. The distal part of film 61 extending from the opening of the Parrone 60 is set in the vicinity of the axis 34.

In this state, the back cover 3 is closed on the camera body 2. A back cover closing detecting means, which is not shown, detects the closing. The sprocket 40 starts rotating counterclockwise in FIG. 7.

The rotation causes the sprocket 40 to engage with perforations of the film 61. The distal part of the film 61 is fed forward of the film wind spool 39 located in the film wind chamber 38.

When a certain period of time has elapsed after the start of the rotation of the sprocket 40, the film wind spool 39 starts rotating clockwise. The distal part of the film 61 is then taken up by the film wind spool 39.

In the meantime, the sprocket 40 is disconnected from a driving source. Thereafter, the sprocket 40 rotates with the winding of the film 61 and serves as a member whose rotation is measured to detect an amount of film wind.

In this embodiment, after the power switch is turned on, film is loaded. Needless to say, a program to be executed by a CPU incorporated in the camera may be written so that even if the power switch is not turned on, back cover closing is carried out to start film loading.

Figure 8:
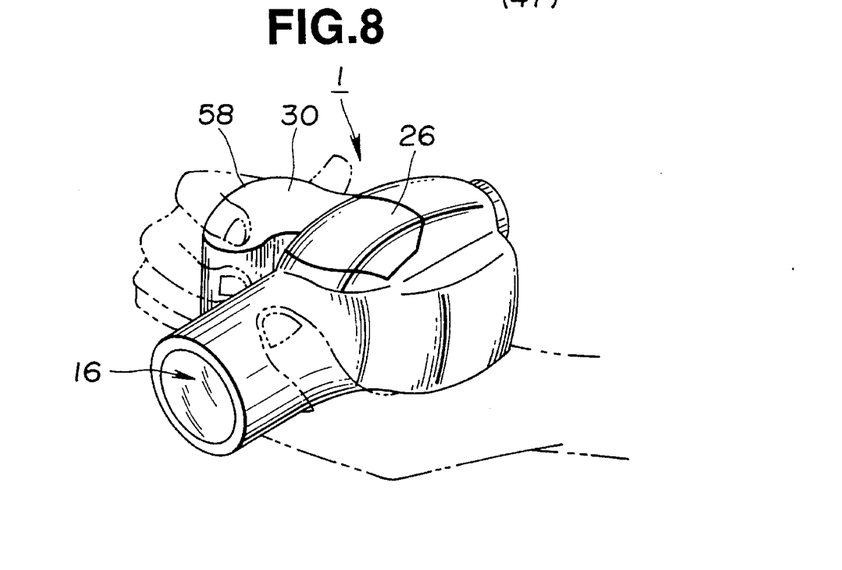
FIG. 8 is an oblique view showing the camera of the first embodiment in a state that the camera is held for photography.

For photography, as shown in FIG. 8, the grip 30 of the camera 1 is held with the right-hand fingers. The index finger is rested on the release button 58. The left-hand fingers are rested on the outer wall 32 of the lens barrel 16 so that the thumb will lightly press the area near the zoom operation buttons 56 and 57.

To start photography, the release button 58 must be pressed to execute a sequence of photographic operations. The focal length of the lens barrel 16 can be modified by pressing the zoom operation buttons 56 and 57.

Figure 9:
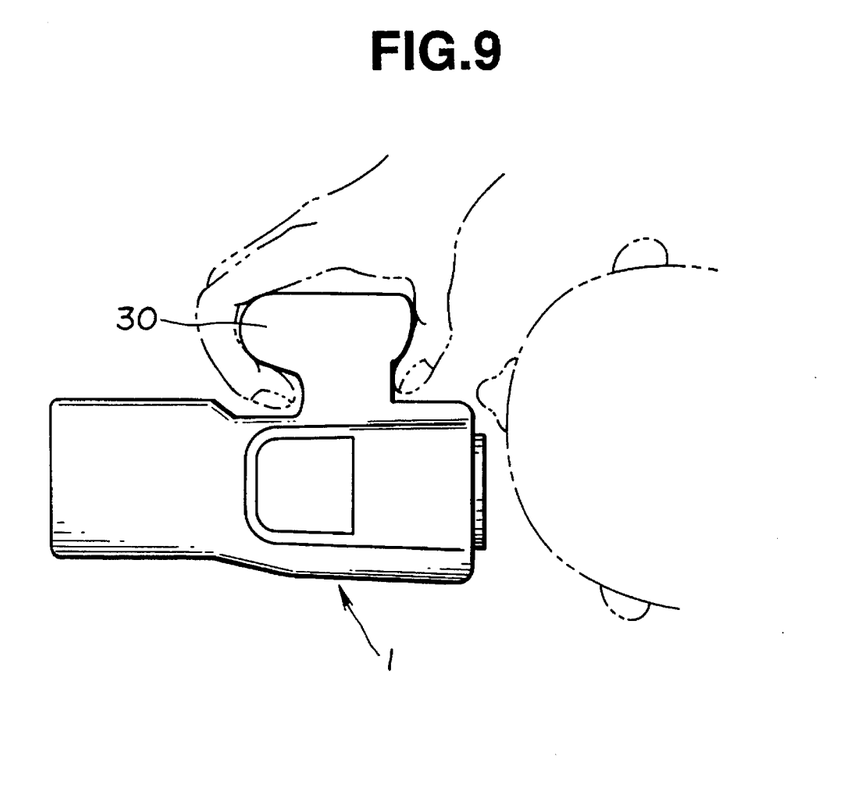
FIG. 9 is a plan top view showlng a scene that the camera of the first embodiment is held.
Figure 10:
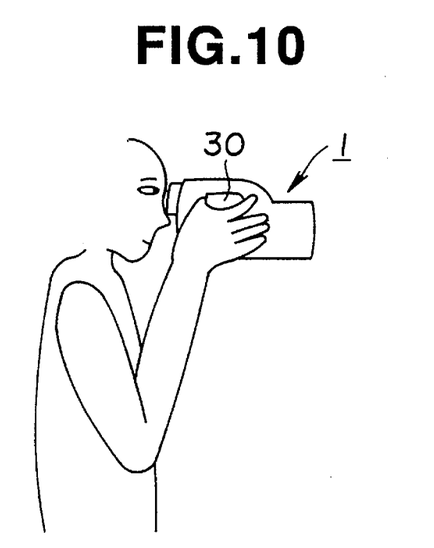
FIG. 10 is a side view showing a scene that the camera of the first embodiment is held.

Owing to the aforesaid outline of the camera, as shown in FIG. 9, the tips of the fingers holding the grip 30 come round fully inward of the grip. The grip 30 can therefore be held firmly. When the eyepiece lens 23 is looked into, as shown in FIG. 10, the right-hand thumb will not extend rearwardly of the projection 35. The right-hand thumb and other fingers will therefore not interfere with the face, promising comfortable photography.

Figure 11:
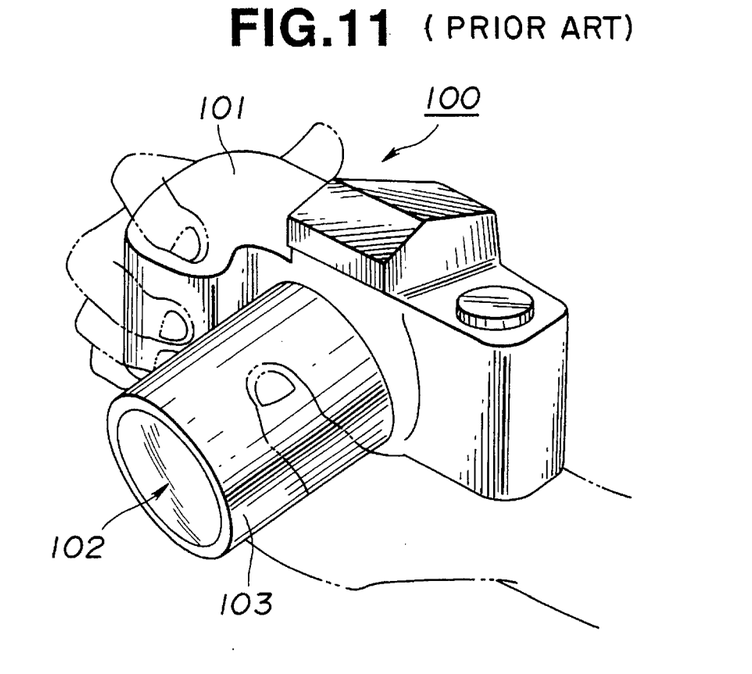
FIG. 11 is an oblique view showing a conventional camera in a state that the camera is is held for photography.

The left hand stays on the out,er wall 32 of the lens barrel 16. Nevertheless, unlike a conventional camera 100 shown in FIG. 11, the bottom of the outer wall of the camera 1 will not interfere with the left-hand wrist. Holding will therefore not be crippled in any way. In FIG. 11, reference numerals 100, 101, 102, and 103 denote a camera body, a grip, a lens array, and a lens barrel.

The outer wall of camera 1 on the opposite side of the grip 30 is flat. When the camera is hung lengthwise by holding the grip 30, the flat portion comes lowest and stays in the left-hand palm. Thus, stable support is provided by the left-hand palm.

According, with the aforesaid first embodiment, a hand tremor can be avoided to the greatest extent because the hold of the grip is made more reliable and the stability in holding a camera is upgraded. The thumb and the other fingers holding the grip will not interfere with the face, enabling comfortable photography. The action of looking into the viewfinder optical system can be done more smoothly.

Figure 12:
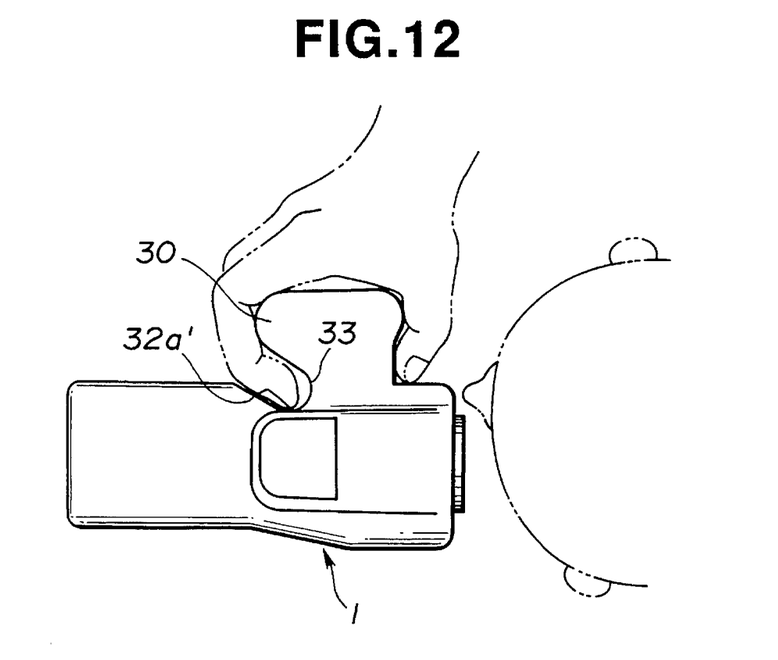
FIG. 12 is a plan view showing from above a scene that a camera of the second embodiment of the present invention is held.

FIG. 12 is a top plan view showing a scene that a camera of the second embodiment of the present invention is held.

In the camera of the second embodiment, the recess 32a on the outer wall 32 in the first embodiment is tapered substantially in parallel with the angle of the wrist coming round for holding the grip, and then provided as a recess 32a'. The communication wall 33 is shaped like a cylindrical surface to match a finger tip. This outline makes it possible to hold the grip 30 more reliably. The other components, and the operation and advantages of the second embodiment are identical to those of the first embodiment, of which description will be omitted.

As described above, the present invention provides a camera in which a hand tremor can be avoided to the greatest extent because the hold of the grip is made more reliable and the stability in holding a camera is upgraded.

In the present invention. it will be apparent that a wide range of different working modes can be formed on the basis of the invention without departing from the spirit and scope of the invention. This invention is not restricted to any specific embodiment and is limited only by the appended claims.

What is claimed is:

1. A camera, comprising:

an opening located in a camera body and defining a film screen;

a lens barrel including an outer wall located in front of said opening and extending in a direction forward of the camera body;

a projection located behind said opening and extending rearwardly from said camera body;

a grip formed on one side surface of said projection, and laterally spaced away from a side of the projection, and having a rear end which lies forward of a rear end of said projection, said grip being held with the fingers of a photographer's hand during photography, said grip having a forward recess in a forward end therof for accomodating the hand holding the grip; and a recess formed on an outer circumference of a side portion of the outer wall of said lens barrel, located in an area adjacent to said grip and inward from a forward end of the lens barrel outer wall in a direction toward the back of the camera and being measured along a line parallel to an optical axis of the lens barrel, and indented toward an inner circumference of said lens barrel and cooperating with said forward recess to accommodate at least a portion of several fingers of the hand holding the grip, said recess receiving said portion of several fingers being located at a back side of each of the several fingers of the hand between a tip and a knuckle which is closest to the tip, whereby the hand holding the grip supports the camera without holding the lens barrel; and wherein said lens barrel comprises an inner lens barrel wall, said outer wall of said lens barrel enclosing said inner lens barrel wall, a portion of the inner lens barrel wall being removed to accommodate the recess provided in said outer wall of said lens barrel.

2. A camera, comprising:

an opening located in a camera body and defining a film screen;

a lens barrel including an outer wall located in front of said opening and extending in a direction forward of the camera body;

a projection located behind said opening and extending rearwardly from said camera body;

a grip formed on one side surface of said projection and laterally spaced away from a side of the projection, and having a rear end which lies forward of a rear end of said projection, said grip being held with the fingers of a photographer's hand during photography, said grip having a forward recess in a forward end thereof for accommodating the hand holdind the grip; and a recess formed on an outer circumference of a side portion of the outer wall of said lens barrel, located in an area adjacent to said grip and inward from a forward end of the lens barrel outer wall in a direction toward the back of the camera and being measured along a line parallel to an optical axis of the lens barrel, indented toward an inner circumference of said lens barrel and cooperating with said forward recess to accommodate at least a portion of several fingers of the hand holding the grip, said recess receiving said portion of several fingers being located at a back side of each of the several fingers of the hand between a tip and a knuckle which is closest to the tip, whereby the hand holding the grip supports the camera without holding the lens barrel and wherein said lens barrel has a lens holding portion with an interior periphery of substantially constant diameter for receiving a taking lens, a portion of an exterior periphery of the lens holding portion being removed to receive the indented portion of said recess in said outer wall.

* * * * *